(12) United States Patent
Cheng et al.

(10) Patent No.: US 8,643,731 B2
(45) Date of Patent: Feb. 4, 2014

(54) IMAGE CAPTURING DEVICE, CONTROL METHOD THEREOF, AND ELECTRONIC DEVICE HAVING THE IMAGE CAPTURING DEVICE

(75) Inventors: Yu-Ming Cheng, Hsinchu (TW); Yun-Chin Li, New Taipei (TW); Chin-Lung Yang, Toufen Township (TW); Yu-Kai Kang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 368 days.

(21) Appl. No.: 13/084,167

(22) Filed: Apr. 11, 2011

(65) Prior Publication Data

US 2012/0162447 A1    Jun. 28, 2012

(30) Foreign Application Priority Data

Dec. 28, 2010 (TW) .............................. 99146278 A

(51) Int. Cl.
*H04N 5/228* (2006.01)
(52) U.S. Cl.
USPC .................................. 348/208.2; 348/208.99

(58) Field of Classification Search
USPC .............................. 348/208.99, 208.1–208.5
See application file for complete search history.

(56) References Cited

U.S. PATENT DOCUMENTS

2007/0242937 A1 * 10/2007 Sano et al. ...................... 396/55

* cited by examiner

*Primary Examiner* — Joel Fosselman
(74) *Attorney, Agent, or Firm* — Wang Law Firm, Inc.; Li K. Wang; Stephen Hsu

(57) ABSTRACT

The present invention discloses an electronic device, an image capturing device and a control method thereof. The image capturing device comprises a vibration sensing unit, a storage unit and a processing unit. The vibration sensing unit detects the vibration of the image capturing device to generate the vibration information correspondingly. The storage unit stores a plurality personal setting files. The processing unit is electronically connected to the vibration sensing unit and the storage unit. Also, the processing unit, based on the vibration information, generates an analysis result automatically or upon receipt of the trigger signal, and stores the analysis result in one of the plurality of personal setting files.

12 Claims, 5 Drawing Sheets

IMAGE CAPTURING DEVICE, CONTROL METHOD THEREOF, AND ELECTRONIC DEVICE HAVING THE IMAGE CAPTURING DEVICE

FIELD OF THE INVENTION

The exemplary embodiment(s) of the present invention relates to an electronic device, image capturing device and a control method thereof. More specifically, the exemplary embodiment(s) of the present invention relates to an to an electronic device and image capturing device and control method which stores vibration information in personal setting files to prevent hand shaking in each image capturing mode.

BACKGROUND OF THE INVENTION

Currently users are still puzzled about the image blurred problem due to hand shaking when taking photos. When operating regular digital camera, users often easily shakes or sways the camera lens due to not carefully or properly holding digital camera in a correct position. In addition, as the volume of the digital camera is getting smaller, it increases the chance of taking blurring photos due to hand shaking when pressing shutter of the smaller digital cameras. Anti-hand shaking digital cameras are coming out in the market to solve the previous problem.

The known anti-hand shaking mechanisms comprises many kinds of methods, which include using the corresponding movement of camera lens mechanism to compensate shaking of the camera, controlling aperture value and shutter opening time to suppress hand shaking phenomena, and using software for signal processing on images to return the definition of images. Previous optical anti-hand shaking mechanisms is used to move the moving lens or the image sensing component vertically or horizontally in order to correct the skewness due to hand shaking. The inverse correction generated by optical anti-hand shaking mechanism can make the camera not to produce blurred images due to swaying. On the other hand, the digital anti-hand shaking mechanism corrects the blurred images due to swaying by algorithm and image processing methods.

The previous optical anti-hand shaking digital camera uses drive circuit to activate floating lens or image capturing units and makes the optical component rapidly move in a two dimension way on the plane of a perpendicular optical axis. Therefore it suppresses or compensates the blurred images due to shaking in order to achieve the goal of hand shaking prevention. In addition, digital anti-hand shaking mechanism performs compensation by software built in camera. Recently, there is a multiple anti-hand shaking camera combining many anti-hand shaking techniques such as optical anti-hand shaking technique, exposure time adjustment and digital anti-hand shaking technique to have a better performance on anti-hand shaking. However, the multiple anti-hand shaking camera uses only fixed methods to combine many anti-hand shaking systems. Moreover, for present anti-hand shaking techniques, it did not have anti-hand shaking setting for users with different customs. In addition, when different user uses the same camera to take a photo, the default mode or learned anti-shaking parameter on the camera is not suitable to each user. Hence it cannot achieve good anti-shaking performance. Based on different hand shaking mode and camera operation of each user, the present invention is proposing an anti-hand shaking learning mechanism to record hand shaking level and camera operation custom of each user and therefore achieve a better anti-hand shaking performance.

SUMMARY

A primary object of the present invention is to provide an electronic device, image capturing device and a control method thereof. It helps solve the problem of poor performance of default anti-hand shaking due to different hand shaking situation and camera operating custom of each user when different users use the same camera to take a photo.

According to an object of the present invention, an image capturing device is disclosed, comprising an input unit, a vibration sensing unit, a storage unit and a processing unit. The vibration sensing unit senses the vibration status of the image capturing device to generate vibration information. The storage unit stores a plurality of personal setting files. The input unit provides a trigger signal to a processing unit after receiving inputs. The processing unit is electronically connected to the vibration sensing unit, the storage unit, and the input unit. The processing unit, based on the vibration information, generates an analysis result automatically or upon receipt of the trigger signal, and stores the analysis result in one of the plurality of personal setting files.

In the present invention, the vibration information and the analysis and statistic information of the operation mode comprises the statistic information of different stages when operating the image capturing device such as a maximum vibration amplitude of focus stage, a minimum vibration amplitude of focus stage, an average vibration amplitude of focus stage, a vibration frequency of focus stage, a continuous vibration time of focus stage, or a maximum vibration amplitude of exposure stage, a minimum vibration amplitude of exposure stage, an average vibration amplitude of exposure stage, a vibration frequency of exposure stage and a continuous vibration time of exposure stage.

In the present invention, the processing unit correspondingly sets an image capturing mode of the image capturing device and stores in each of the corresponding personal setting files based on the statistic analysis results of vibration information and operation mode stored in each of the personal setting files.

In the present invention, the image capturing mode comprises an exposure time delay, exposure parameters or different hand shaking prevention system parameters.

According to an object of the present invention, a control method applied to an image capturing device which comprises an input unit, a vibration sensing unit, a storage unit and a processing unit is disclosed, The control method of an image capturing comprises the following steps: sensing the vibration status of the image capturing device and generating a vibration information correspondingly by a vibration sensing unit; providing a trigger signal after receiving inputs by the input unit; and generating an analysis result based on the vibration information by the processing unit automatically or upon receipt of the trigger signal, and storing the analysis result in a personal setting file in the storage unit.

In the present invention, the vibration information and analysis and statistic information of the operation mode further comprises statistic information of different stages when operating the image capturing device, such as a maximum vibration amplitude of focus stage, a minimum vibration amplitude of focus stage, an average vibration amplitude of focus stage, a vibration frequency of focus stage, a continuous vibration time of focus stage, or a maximum vibration amplitude of exposure stage, a minimum vibration amplitude of exposure stage, an average vibration amplitude of exposure stage, a vibration frequency of exposure stage and a continuous vibration time of exposure stage.

In the present invention, the processing unit correspondingly sets an image capturing mode of the image capturing device and stores in each of the corresponding personal setting files based on the statistic analysis results of vibration information and operation mode stored in each of the personal setting files.

In the present invention, the image capturing mode comprises exposure time delay, exposure parameters or different hand shaking prevention system parameters.

According to an object of the present invention, an electronic device is further disclosed, comprising a main body and an image capturing device. The image capturing device is comprised in the main body and comprises a vibration sensing unit, a storage unit, an input unit, and a processing unit. The vibration sensing unit senses the vibration status of the image capturing device and generates vibration information correspondingly. The storage unit stores a plurality of personal setting files. An input unit provides a trigger signal to a processing unit after receiving inputs. The processing unit is electronically connected to the vibration sensing unit, the storage unit and the input unit. Also, the processing unit generates an analysis result based on the vibration information automatically or upon receipt of the trigger signal, and stores the analysis result in one of the plurality of personal setting files.

In the present invention, the electronic device comprises a smart phone, a navigator or a personal digital assistant (PDA).

In the present invention, the vibration information and the analysis and statistic information of the operation mode comprises statistic information of different stages when operating the image capturing device, such as a maximum vibration amplitude of focus stage, a minimum vibration amplitude of focus stage, an average vibration amplitude of focus stage, a vibration frequency of focus stage, a continuous vibration time of focus stage, or a maximum vibration amplitude of exposure stage, a minimum vibration amplitude of exposure stage, an average vibration amplitude of exposure stage, a vibration frequency of exposure stage and a continuous vibration time of exposure stage.

In the present invention, the processing unit correspondingly sets an image capturing mode of the image capturing device and stores in each of the corresponding personal setting files based on the statistic analysis results of vibration information and operation mode stored in each of the personal setting files.

In the present invention, the image capturing mode comprises exposure time delay, exposure parameters or a plurality of different hand shaking prevention system parameters.

The present invention of the electronic device, the image capturing device and the control method mentioned above has one or more advantages as the following:

The electronic device, the image capturing device, and the control method disclosed by this invention can learn the hand shaking situations and operation mode when different users press the shutter, and then adjust different shooting modes according to different hand shaking situations and operation mode. It enhances the anti-hand shaking performance when different users use the same camera.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
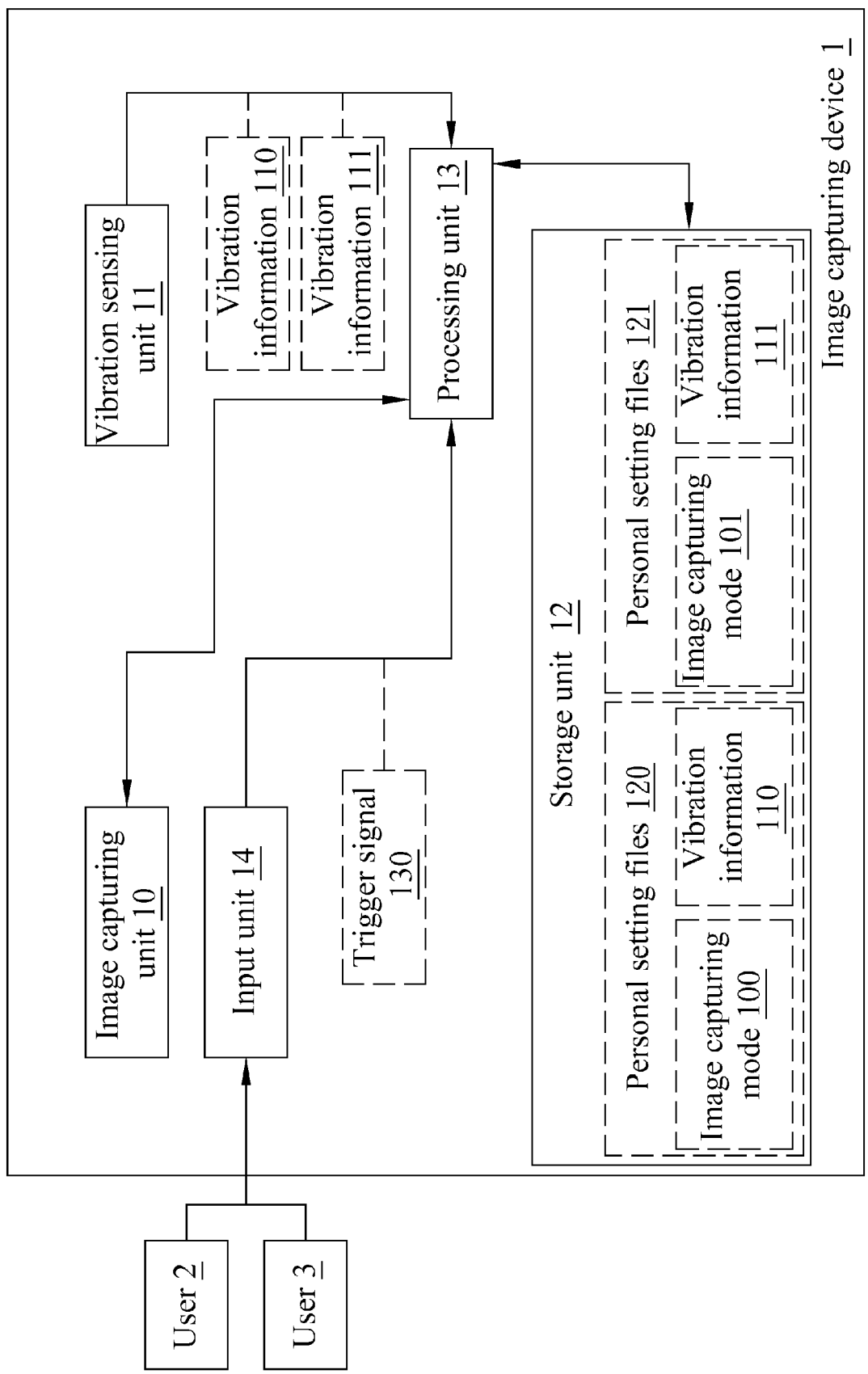
FIG. 1 is a block diagram of an image capturing device according to an embodiment of the present invention.

The present invention will now be described with some preferred embodiments thereof and with reference to the accompanying drawings. For the purpose of being easy to understand, elements that are the same in the preferred embodiments are denoted by the same reference numerals.

Please refer to FIG. 1 that is a block diagram of an image capturing device according to an embodiment of the present invention. As shown, the image capturing device 1 comprises an image capturing module 10, a vibration sensing system 11, a storage unit 12, a processing unit 13 and an input unit 14. The image capturing unit 10 may comprises a light sensing component such as complementary metal-oxide-semiconductor (CMOS), a charge-couple-device (CCD) or a camera lens and lens assembly. The vibration sensing unit 11 senses the vibration information 110 of the image capturing device 1. The vibration sensing unit 11 may be a gyroscope, an acceleration sensor or their combination. The storage unit 12 stores a plurality of personal setting files 120 and 121 and may be an embedded memory, an external memory card or their combination. The processing unit 13 is electronically connected to the image capturing unit 10, the vibration sensing unit 11, storage unit 12 and the input unit 14, and may be a central processing unit (CPU) or a micro-processing unit. The processing unit 13 receives the vibration information 110 after receiving a trigger signal 130, and then stores the vibration information 110 and the results of operation mode analysis and statistics into one of the plurality of personal setting files 120 and 121. In some of the better embodiments, the image capturing device 1 of this invention can be a digital camera or a digital video camera.

Figure 2:
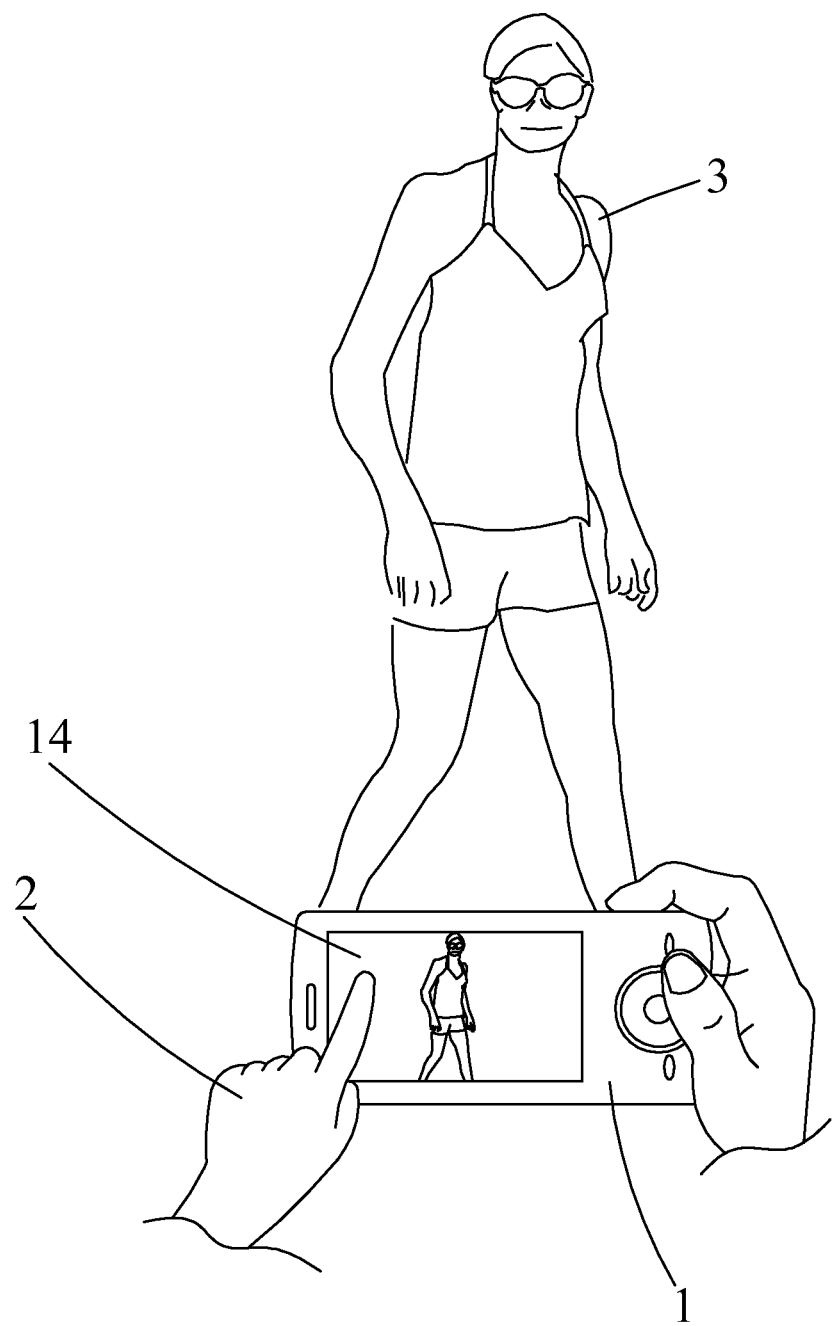
FIG. 2 is a schematic diagram of an image capturing device according to an embodiment of the present invention.

Please refer to FIG. 2 that is a schematic diagram of an image capturing device according to an embodiment of the present invention. As shown, the image capturing device 1 is a digital camera which comprises an input unit 14. The input unit 14 provides the trigger signal 130 to the processing unit 13 by using the touching device or key to set automatically or receive inputs. Please also refer to FIG. 1, in the embodiment, user 2 uses a touch screen on the camera to set a command of "automatic hand shaking learning mode", and then takes pictures for user 3 by the digital camera. When taking pictures, the vibration sensing unit 11 detects the vibration situation of the image capturing device 1, and correspondingly generates the vibration information 110 or a vibration 111 to the processing unit 13. Moreover, the processing unit 13 receives the vibration information 110 or vibration 111 after receiving the trigger signal 130, processes the analysis and statistics based on of the current operation mode information, and then stores the results in the personal setting file 120. The processing unit 13 then conducts statistic analysis of the information. In addition, the vibration information and the analysis and statistics information of operation mode are comprised in the statistical information of the different stages when operating the image capturing device, such as a maximum vibration amplitude of focus stage, a minimum vibration amplitude of focus stage, an average vibration amplitude of focus stage, a vibration frequency of focus stage, a continuous vibration time of focus stage, or a maximum vibration amplitude of exposure stage, a minimum vibration amplitude of exposure stage, an average vibration amplitude of exposure stage, a vibration frequency of exposure stage or a continuous vibration time of exposure stage. Based on the above information, the processing unit 13 sets various parameters of the most appropriate image capturing mode 100 in the personal setting file 120. The image capturing mode 100 comprises exposure time delay, exposure parameter, and different anti-hand shaking system parameters. Moreover, parameters of different multiple anti-hand shaking systems, such as numbers of multiple superimposed frames or exposure time, are best set by the processing unit 13 according to the results of analysis and statistics. Hence user 2 can command the processing unit 13 to read the personal setting files 120 when using this digital camera next time, and make the image capturing mode of this digital camera match the hand shaking situation according to the actuation that personal setting files 120 controls the image capturing unit 10.

Figure 3:
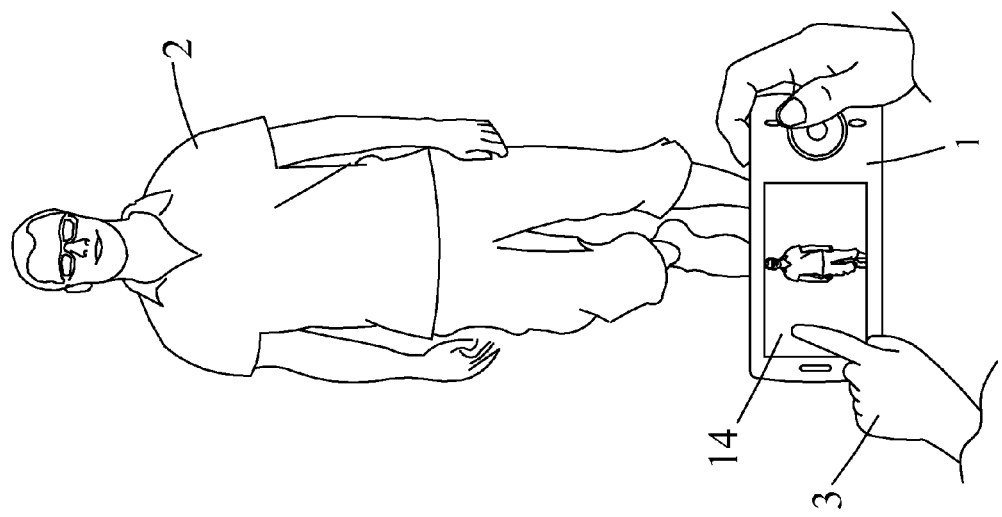
FIG. 3 is another schematic diagram of an image capturing device according to an embodiment of the present invention.

Please refer to FIG. 3 that is another schematic diagram of an image capturing device according to an embodiment of the present invention. As shown, it shows the situation that when taking pictures for user 3 as shown in FIG. 2, then user 3 continues to take pictures for user 2. As mentioned above, user 3 can use the touch screen on the camera to set a command for another hand shaking learning, and then take pictures for user 2 by the digital camera. When taking pictures, the vibration sensing unit 11 detects the vibration status of the image capturing unit 1, and generates the vibration information 110 or a vibration 111 to the processing unit 13. Moreover, the processing unit 13 receives the vibration information 110 or vibration 111 after receiving the trigger signal 130, processes the analysis and statistics based on current operation mode information, and stores the results in the personal setting file 121. The processing unit 13 then will conduct statistic analysis of the information. In addition, the vibration information and the analysis and statistics information of operation mode are comprised in the statistical information of the different stages when operating the image capturing device, such as a maximum vibration amplitude of focus stage, a minimum vibration amplitude of focus stage, an average vibration amplitude of focus stage, a vibration frequency of focus stage, a continuous vibration time of focus stage, or a maximum vibration amplitude of exposure stage, a minimum vibration amplitude of exposure stage, an average vibration amplitude of exposure stage, a vibration frequency of exposure stage or a continuous vibration time of exposure stage. Based on the above information, the processing unit 13 sets various parameters of the most appropriate image capturing mode 101 in the personal setting file 121. The image capturing mode 101 comprises exposure time delay, exposure parameter, and different anti-hand shaking parameters such as numbers of multiple superimposed frames or exposure time.

It is worth mentioning that after recording many personal files, the processing unit 13 further provides a selection interface (not shown) for users to conduct a selection of learning personal anti-hand shaking function or choosing the personal anti-hand shaking shooting mode. User can select personal anti-hand shaking shooting mode by the input unit 14 and the selection interface.

Please refer to Table. 1 that is the corresponding setting values of the different users. As shown, in this embodiment, the personal setting files 120 and 121 are presented in the table and the contents comprises the results of analysis and statistics based on the user's vibration information and operation mode, such as a maximum vibration amplitude of focus stage, a minimum vibration amplitude of focus stage, an average vibration amplitude of focus stage, a vibration frequency of focus stage, a continuous vibration time of focus stage, or a maximum vibration amplitude of exposure stage, a minimum vibration amplitude of exposure stage, an average vibration amplitude of exposure stage, a vibration frequency of exposure stage and a continuous vibration time of exposure stage. The processing unit 13 provides parameters for each image capturing mode after analyzing the information such as the exposure time delay and the exposure parameter. To describe it briefly, only parts of the parameters of image capturing mode are shown in Table 1. Users with general knowledge in the field should easily add other related parameters, and this will not be repeated again here.

TABLE 1

The setting values corresponding to the different users

| | Vibration Information | | | Image Capturing Mode | | |
|---|---|---|---|---|---|---|
| | Amplitude | Frequency | Continuous Time | ... | Exposure Time Delay | Multiple Anti-hand shaking | ... |
| User 2 | 5 | 2.5 | 1 | | 0.5 | ON | |
| User 3 | 4 | 3.5 | 0.8 | | 0.5 | ON | |
| ... | | | | | | | |

Figure 4:
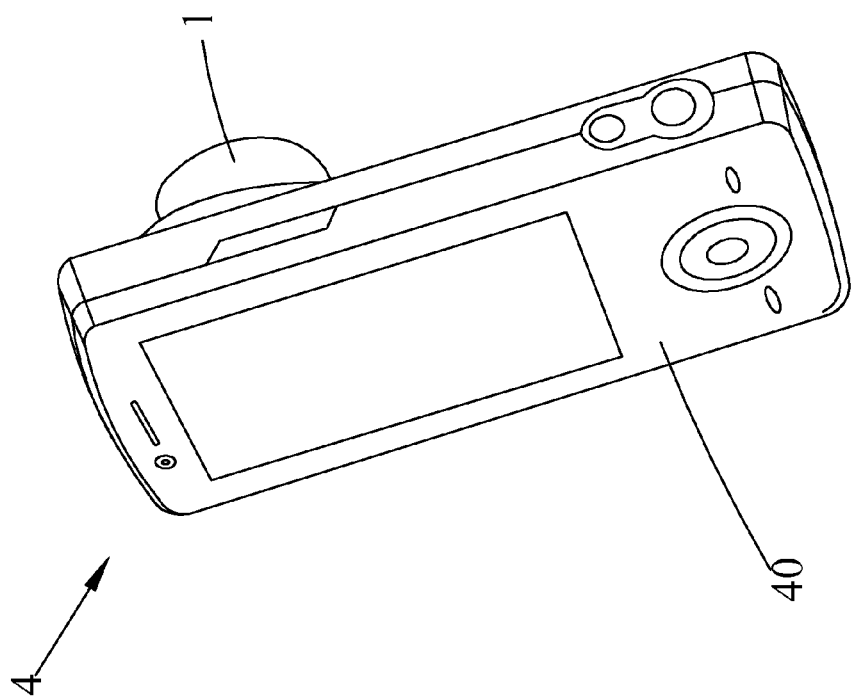
FIG. 4 is a schematic diagram of the electronic device according to an embodiment of the present invention.

Please also refer to FIG. 4 that is a schematic diagram of the electronic device according to the embodiment of the present invention. As shown in the figure, the electronic device 4 in the present invention comprises a main body 40 and an image capturing device 1, and the image capturing device 1 further comprises the image capturing unit, the vibration sensing unit, the input unit, the storage unit and the processing unit. The image capturing device here is described in details in the previous section and will not be repeated again. However, it is worth mentioning that the electronic device 4 in the present invention may be any kinds of mobile handheld device, such as a multimedia playing device with camera function, a mobile phone with camera function, a smartphone, a navigator or a personal digital assistant (PDA). In this embodiment, the electronic device 4 of the present invention is a smart phone. It can embed the image capturing device 1 disclosed in the present invention for taking picture. Moreover, user may input a command of anti-hand shaking learning by the input device on the smart phone such as touch screen or physical key when taking pictures. Therefore, the electronic device 4 starts to process the personal anti-hand shaking learning mentioned above, and stores for different users to choose, which further increases the effect of anti-hand shaking. The smartphone disclosed in this embodiment is for the example but not the limitation. Users with general knowledge in this field should be able to easily replace other device to go with the image capturing device 1 of this invention.

Despite the fact that a control method of the image capturing device of this invention has also been illustrated while explaining the image capturing device of this invention in the previous section, to be clear, a flowchart is showed for detailed explanation.

Figure 5:
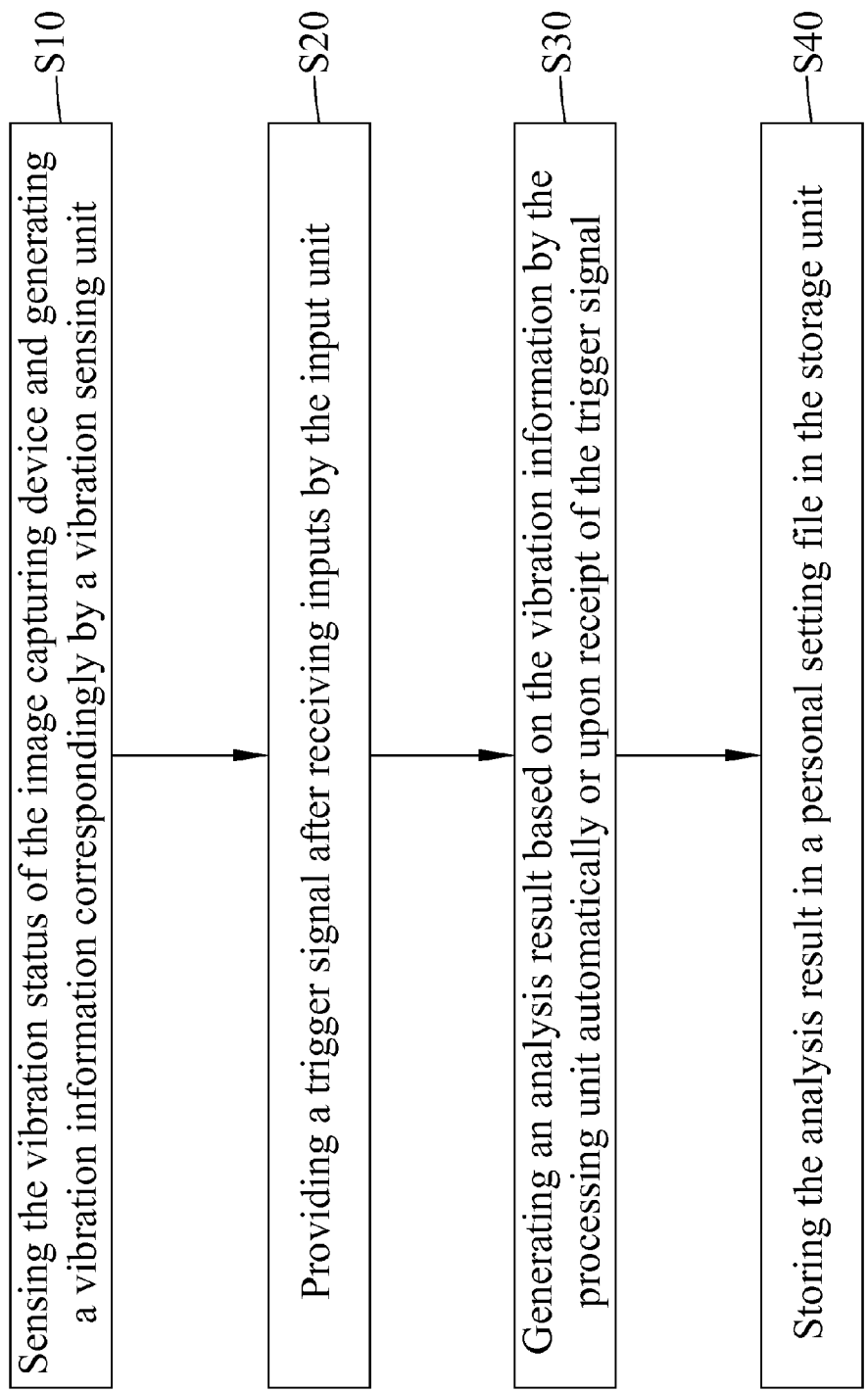
FIG. 5 is a flowchart of a control method of the image capturing device according to an embodiment of the present invention.

Please refer to FIG. 5 that is a flowchart of a control method of the image capturing device of this invention. As shown, the control method of the image capturing device of this invention is applied to an image capturing device. The image capturing device comprises a vibration sensing unit, a storage unit, and a processing unit. The control method of the image capturing device comprises the following steps:

(S10) sensing the vibration status of the image capturing device and generating a vibration information correspondingly by a vibration sensing unit;

(S20) providing a trigger signal after receiving inputs by the input unit;

(S30) generating an analysis result based on the vibration information by the processing unit automatically or upon receipt of the trigger signal; and (S40) storing the analysis result in a personal setting file in the storage unit.

Because the detailed description and implementation method of the image capturing device and a control method of this invention have been described in the previous section of the image capturing device and the electronic device of this invention, it will not be stated again.

In sum, the electronic device, the image capturing device, and the control method disclosed by this invention can learn the hand shaking situations when different users take pictures, and then adjust different shooting mode according to different hand shaking situations. It enhances the anti-hand shaking performance when different users use the same camera and effectively solves the problem that used anti-hand shaking technique is not suitable for different users.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. An image capturing device, comprising:
a vibration sensing unit capable of sensing the vibration status of the image capturing device to generate vibration information correspondingly;
a storage unit storing a plurality of personal setting files, wherein each of the personal setting files is corresponding to an image capturing mode of one of a plurality of users using the image capturing device;
an input unit capable of providing a trigger signal to a processing unit after receiving inputs; and
the processing unit electronically connected to the vibration sensing unit, the storage unit and the input unit;
wherein the processing unit, based on the vibration information, generates an analysis result automatically or upon receipt of the trigger signal, and stores the analysis result in one of the plurality of personal setting files, while the processing unit is commended by the user through the input unit to read the personal setting file corresponding to the user, the image capturing device is controlled according to the image capturing mode corresponded to the personal setting file read to achieve a better anti-hand shaking performance for each of the plurality of users.

2. The image capturing device as recited in claim 1, wherein the vibration information comprises a maximum vibration amplitude of focus stage, a minimum vibration amplitude of focus stage, an average vibration amplitude of focus stage, a vibration frequency of focus stage, a continuous vibration time of focus stage, or a maximum vibration amplitude of exposure stage, a minimum vibration amplitude of exposure stage, an average vibration amplitude of exposure stage, a vibration frequency of exposure stage or a continuous vibration time of exposure stage of the image capturing device.

3. The image capturing device as recited in claim 1, wherein the processing unit correspondingly sets an image capturing mode of the image capturing device and stores in each of the corresponding personal setting files based on the analysis results stored in each of the personal setting files.

4. The image capturing device as recited in claim 3, wherein the image capturing mode comprises an exposure time delay, a plurality of exposure parameters or a plurality of different hand shaking prevention system parameters.

5. A control method, used in an image capturing device comprising an input unit, a vibration sensing unit, a storage unit and a processing unit, comprising the following steps:
sensing the vibration status of the image capturing device and generating vibration information correspondingly by a vibration sensing unit;
providing a trigger signal after receiving inputs by the input unit; and
generating an analysis result based on the vibration information by the processing unit automatically or upon receipt of the trigger signal, and storing the analysis result in one of a plurality of personal setting files in the storage unit, wherein each of the personal setting files is corresponding to an image capturing mode of one of a plurality of users using the image capturing device, while the processing unit is commended by the user through the input unit to read the personal setting file corresponding to the user, the image capturing device is controlled according to the personal setting file read to achieve a better anti-hand shaking performance for each of the plurality of users.

6. The control method of the image capturing device as recited in claim 5, wherein the vibration information comprises a maximum vibration amplitude of focus stage, a minimum vibration amplitude of focus stage, an average vibration amplitude of focus stage, a vibration frequency of focus stage, a continuous vibration time of focus stage, or a maximum vibration amplitude of exposure stage, a minimum vibration amplitude of exposure stage, an average vibration amplitude of exposure stage, a vibration frequency of exposure stage or a continuous vibration time of exposure stage of the image capturing device.

7. The control method of the image capturing device as recited in claim 5, wherein the processing unit correspondingly sets an image capturing mode of the image capturing device and stores in each of the corresponding personal setting files based on the analysis result stored in each of the personal setting files.

8. The control method of the image capturing device as recited in claim 7, wherein the image capturing mode comprises an exposure time delay, an exposure parameter or a plurality of different hand shaking prevention system parameters.

9. An electronic device, comprising:
a main body;
an image capturing device comprised in the main body, comprising:
a vibration sensing unit sensing the vibration status of the image capturing device and generating a vibration information correspondingly;
a storage unit storing a plurality of personal setting files, wherein each of the personal setting files is corresponding to an image capturing mode of one of a plurality of users using the image capturing device;

an input unit providing a trigger signal to a processing unit after receiving inputs; and the processing unit electronically connected to the vibration sensing unit, the storage unit and the input unit and generating an analysis result based on the vibration information automatically or upon receipt of the trigger signal, and storing the analysis result in one of the plurality of personal setting files, while the processing unit is commended by the user through the input unit to read the personal setting file corresponding to the user, the image capturing device is controlled according to the personal setting file read to achieve a better anti-hand shaking performance for each of the plurality of users.

10. The electronic device as recited in claim 9, wherein the vibration information comprises a maximum vibration amplitude of focus stage, a minimum vibration amplitude of focus stage, an average vibration amplitude of focus stage, a vibration frequency of focus stage, a continuous vibration time of focus stage, or a maximum vibration amplitude of exposure stage, a minimum vibration amplitude of exposure stage, an average vibration amplitude of exposure stage, a vibration frequency of exposure stage or a continuous vibration time of exposure stage of the image capturing device.

11. The electronic device as recited in claim 9, wherein the processing unit correspondingly sets an image capturing mode of the image capturing device and stores in each of the corresponding personal setting files based on the analysis results stored in each of the personal setting files.

12. The electronic device as recited in claim 11, wherein the image capturing mode comprises an exposure time delay, an exposure parameter or a plurality of different hand shaking prevention system parameters.

* * * * *